April 20, 1965   M. P. MATTHEW   3,179,005
SLIDE PROJECTOR WITH A HELICAL SLIDE TRANSFER PATH
Filed Jan. 27, 1961   7 Sheets-Sheet 1

INVENTOR.
MORTON P. MATTHEW
BY Frank C. Parker
ATTORNEY

April 20, 1965  M. P. MATTHEW  3,179,005
SLIDE PROJECTOR WITH A HELICAL SLIDE TRANSFER PATH
Filed Jan. 27, 1961  7 Sheets-Sheet 3

INVENTOR.
MORTON P. MATTHEW
BY Frank C. Parker
ATTORNEY

April 20, 1965   M. P. MATTHEW   3,179,005
SLIDE PROJECTOR WITH A HELICAL SLIDE TRANSFER PATH
Filed Jan. 27, 1961   7 Sheets-Sheet 4

INVENTOR.
MORTON P. MATTHEW
BY Frank C. Parker
ATTORNEY

April 20, 1965 M. P. MATTHEW 3,179,005
SLIDE PROJECTOR WITH A HELICAL SLIDE TRANSFER PATH
Filed Jan. 27, 1961 7 Sheets-Sheet 5
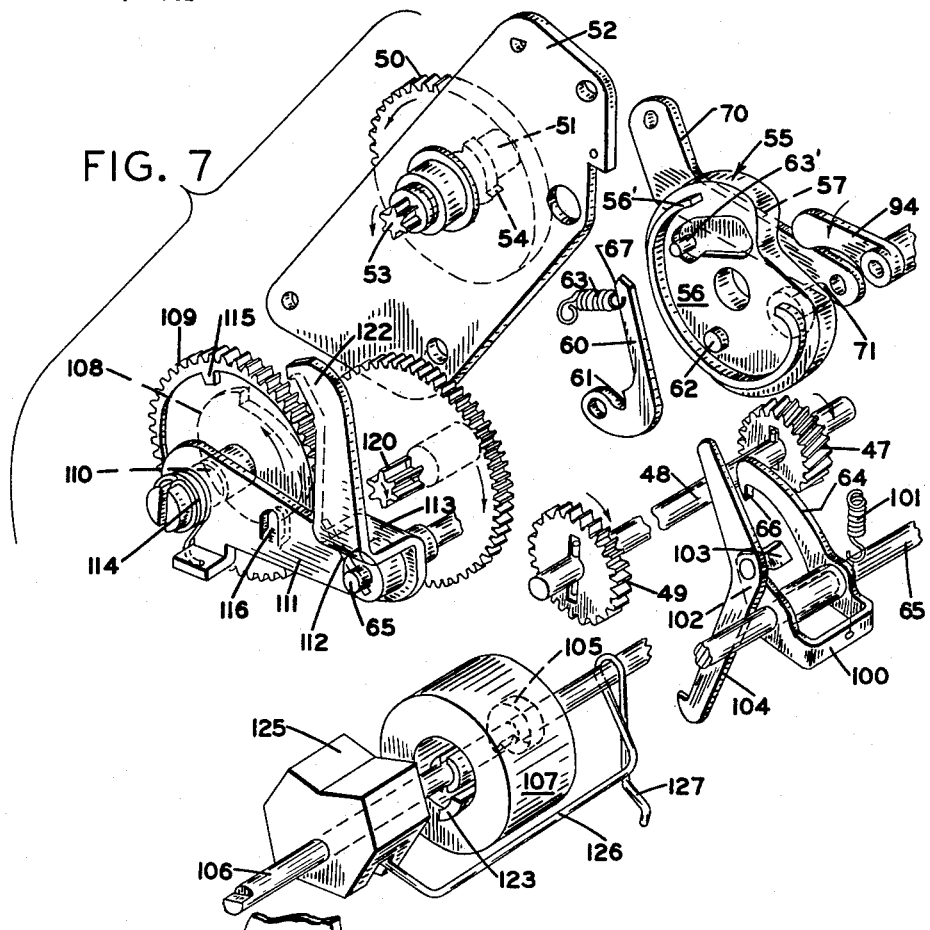
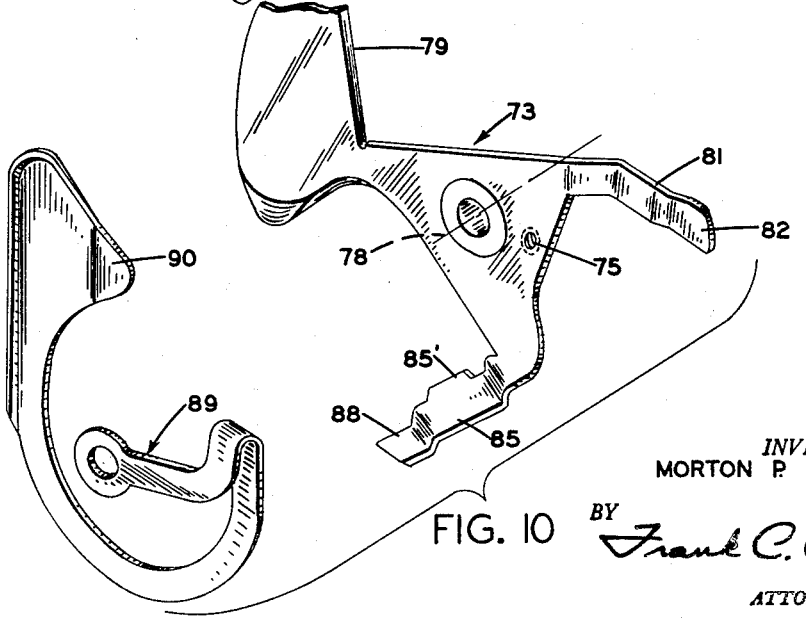
INVENTOR.
MORTON P. MATTHEW
BY Frank C. Parker
ATTORNEY

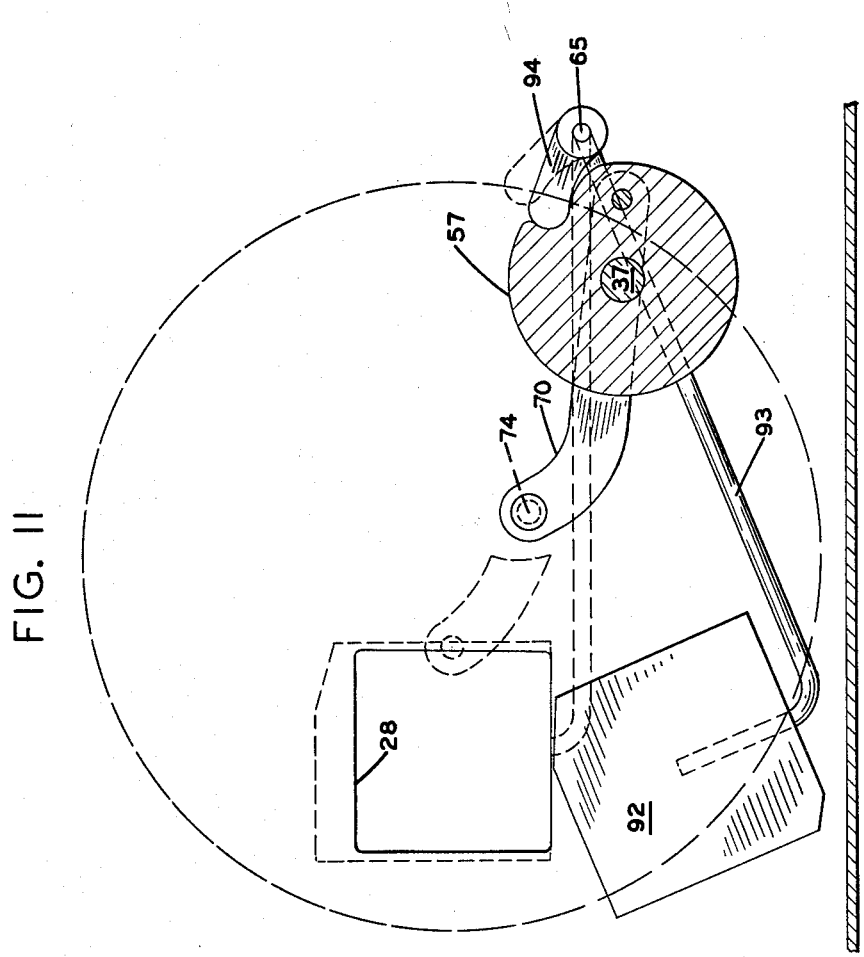

3,179,005
SLIDE PROJECTOR WITH A HELICAL SLIDE
TRANSFER PATH
Morton P. Matthew, Norwalk, Conn., assignor to Bausch & Lomb Incorporated, Rochester, N.Y., a corporation of New York
Filed Jan. 27, 1961, Ser. No. 85,236
7 Claims. (Cl. 88—28)

The present invention relates in general to slide projectors and more particularly to slide projectors of the type which automatically project the images from successive slides onto a viewing screen for predetermined time intervals.

In most automatic slide projectors on the market today, the slides are stored in slide storage trays which are advanced in a stepped manner to bring successive slides in the trays into position to be moved into projection position. There have been a few commercial automatic slide projectors in which the slides are retained in a compartment in a stack and are automatically moved successively into projection position. The principal object of the present invention is to provide an improved type of slide projector of the last-mentioned general form.

The present invention utilizes a novel mechanism for moving the slides from a storage compartment into projection position and thence into a receiving compartment. More particularly, a slide transfer mechanism is provided which comprises a rather flat cylindrically shaped member which forms a helical path defined by a plurality of steps. A multi-armed member is provided for successively advancing slides from the storage chamber to a slide preheating position in order to "pop" the slides so that they will be in proper focus, followed by movement of the slides into a projection position and thence followed by movement of the slides from the projection position into the slide receiving compartment.

A unique time control mechanism is used in the present invention and combines a differentially controlled member which actuates a clutch mechanism that, in turn, controls the advancement of the slides. The differential controlled timing mechanism is actuated on the one hand by a cam which is motor driven and is designed to normally effect actuation of the slide moving mechanism after a predetermined interval of time. The differentially controlled member is, on the other hand, subject to manual control also and this enables variation of the period of response for the time control member.

Among the principal advantages afforded by the slide projector of the present invention are its simplicity of construction, efficiency of operation, and economy of manufacture. The foregoing and additional objects and advantages of the present invention will become more apparent from the following detailed description, when read in conjunction with the accompanying drawings, wherein:

FIG. 7 is an exploded view of the drive and time control mechanism;

FIG. 10 is a perspective view of the multi-armed member and the spring member used in the slide transfer mechanism; and FIG. 11 is a fragmentary view illustrating the shutter and control cam therefor.

Figure 1:
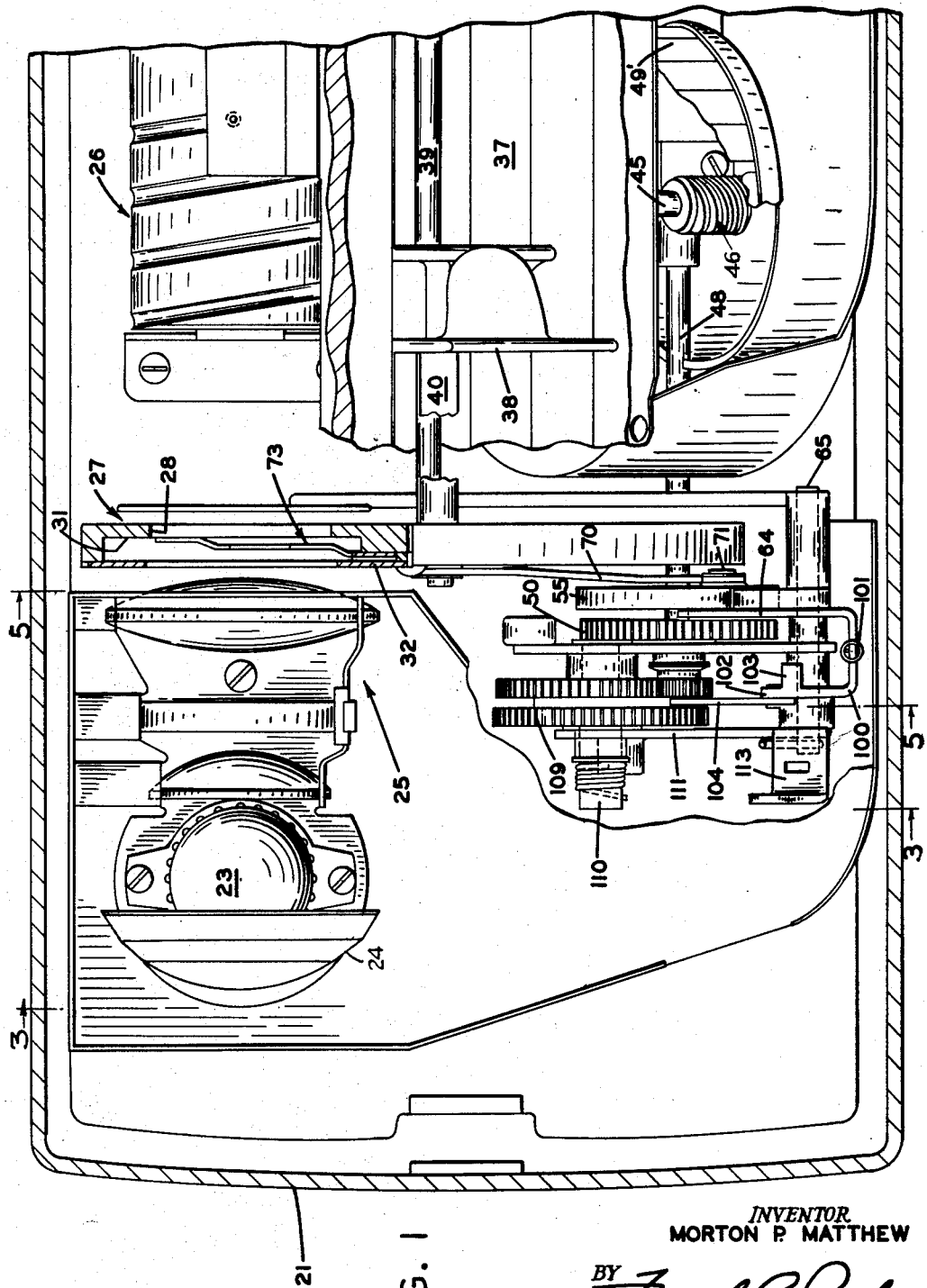
FIG. 1 is a top plan view of the slide projector comprising the subject matter of the present invention with certain of the elements cut away in order to more clearly disclose other features of the projector.
Figure 2:
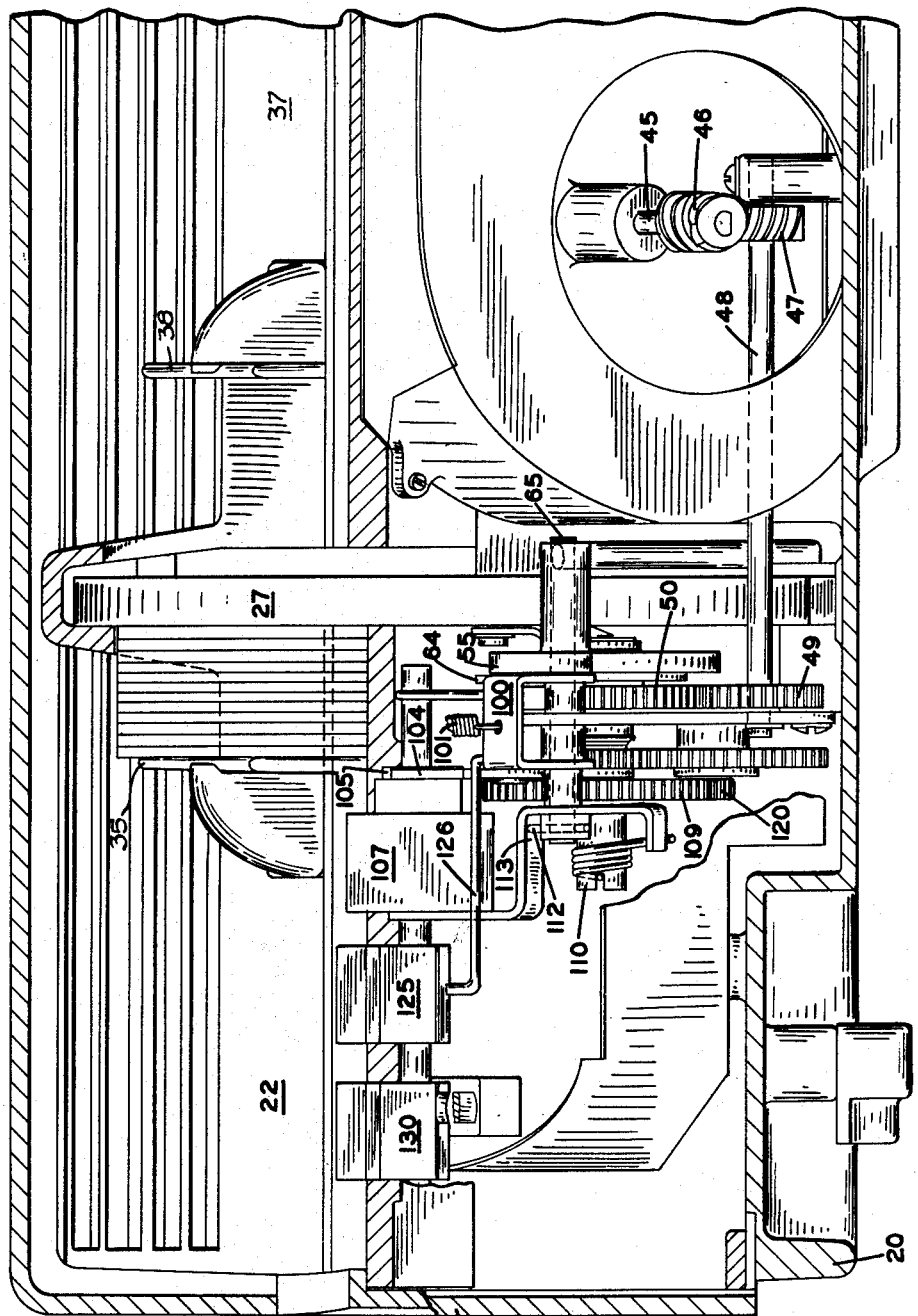
FIG. 2 is a side elevational view of the slide projector with certain of the elements cut away to more clearly illustrate other features of the invention.

With reference to the drawings, wherein like reference numerals in the different views have been used to identify identical parts, the slide projector comprising the subject matter of the present invention includes a base casting or member 20 which supports the slide projector as a whole. Cover means are provided for the slide projector and comprise a cover member 21 which fits over most of the slide projector mechanism and around the base 20. The cover mechanism also includes a member 22 which is adapted to be securely fastened to the slide projector mechanism by screws, bolts or other means not shown.

The slide projector includes a projection lamp 23 including a reflector 24, a condenser lens assembly 25, and an adjustable projection lens assembly 26. The projection lamp 23, condenser lens assembly 25 and projection lens assembly 26 are disposed in substantially optical alignment.

Positioned between the condenser lens assembly 25 and projection lens assembly 26 is a slide transfer mechanism illustrated generally by reference numeral 27. The slide transfer mechanism 27 has the outward shape of a substantially flat cylinder and is formed with a transverse opening 28 in optical alignment with the projection lamp 23, condenser lens 25 and projection lens assembly 26. The slide transfer mechanism 27 defines a substantially helical path which is formed by stepped portions 29, 30 and 31. The slide transfer mechanism 27 is formed with a cover plate 32 which has an opening 33 therein in substantial alignment with a slide storage compartment 34 formed by a generally U-shaped depression in cover member 22. The space between cover plate 32 and surface 29 is only sufficient to allow a single slide to enter the space. A suitable pressure plate 35 is slidable axially along a rod or shaft 36 under the constant urging of a spring, not shown, and at all times maintains a slide adjacent to the surface 29 of slide transfer mechanism 27. In line with the slide storage compartment 34 but on the opposite side of the slide transfer mechanism 27 is a slide receiving compartment 37 which is adapted to receive slides after they have been conveyed through the slide transfer mechanism. A spring urged pressure plate 38 is slidably mounted on a rod or shaft 39 and is urged toward the slide transfer mechanism 27 by means of a spring member 40. The pressure plate 38 yields as slides enter the storage compartment 37 upon emerging from the slide transfer mechanism 27 through an opening (not shown) in alignment with the slide receiving compartment 37.

The slide projector includes a substantially constant speed electric driving motor (not shown) having a drive shaft 45 formed with a worm 46 thereon. The worm 46 meshes with a worm gear 47 mounted at one end of a rotatable shaft 48. A cooling fan 49' is continuously driven by the driving motor in order to draw air through the projector to thereby cool the same. At the opposite end of the shaft 48 is a pinion gear 49 which continuously drives a gear 50. The gear 50 is carried on an integral shaft 51 which is rotatably mounted by means of a mounting plate 52 secured to the base 20. Also a part of shaft 51 is a small pinion gear 53 and a toothed positive clutch member 54. The positive clutch member 54 comprises a part of a positive clutch 55 comprising a plate 56 formed with a flange 57 which forms a cam 58. The plate 56 is formed on its opposite side with a flange 56', the purpose of which will be described hereinafter. The positive clutch 55 also includes a dog 60 having a tooth 61 which cooperates with toothed positive clutch member 54. The dog 60 is pivotally mounted on a pin 62 carried by clutch plate 56 and a tension spring 63 fastened to a pin 63' urges the dog 61 in a counterclockwise direction about pivot pin 62. A control lever 64 pivotally mounted on a shaft 65 has a toothed end 66 which normally rests upon flange 56' during rotation of the clutch 55 and which is adapted to cooperate with the tip 67 of clutch dog 60. When the control lever 64 is in the position shown in FIG. 5, the dog 60 is held disengaged from the toothed positive clutch member 54 so that the clutch element 55 is not rotatable. Upon withdrawal of the control member 64 from engagement with the tip of clutch dog 60, the spring 63 draws the clutch dog 60 in a counterclockwise direction to enable the tooth 61 to positively engage one of the teeth on the positive clutch member 54 to effect clutching engagement between shaft 51 and clutch member 55.

The clutch member 55 has a link 70 pivotally connected thereto by means of a pin 71 and the link 70 is connected to a multi-armed member 73 by means of a pin 74 which extends into a hole 75 in the multi-armed lever 73. The pin 74 passes through an arcuate slot 76 formed in the face of the cylindrical slide transfer mechanism and upon rotation of clutch member 55, the link 70 effects oscillatory movement of the multi-armed member 73 about its axis 78.

The multi-armed member 73 includes a first arm 79 having a substantially flat leading edge adapted to engage one edge of the slide disposed in abutment with surface 29. Upon rotation of clutch member 55, the arm 79 advances this first slide 80 arcuately over surface 29 until it passes over the edge thereof onto surface 30. The slide disposed on surface 30 is in the "preheating" position wherein warm air which is drawn by the fan 49' passes thereover in order to effect popping of this slide. The slide disposed on surface 30 may be said to be in the preheating position or popping position.

Figure 5:
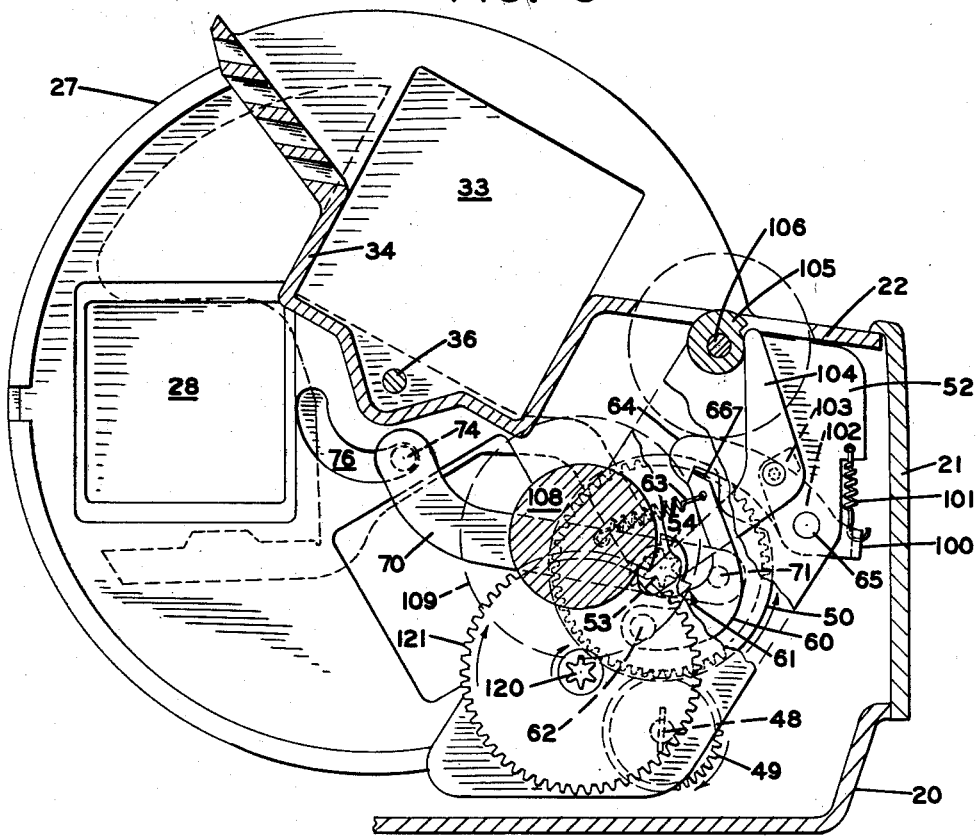
FIG. 5 is a sectional view taken substantially along the line 5—5 in FIG. 1.
Figure 6:
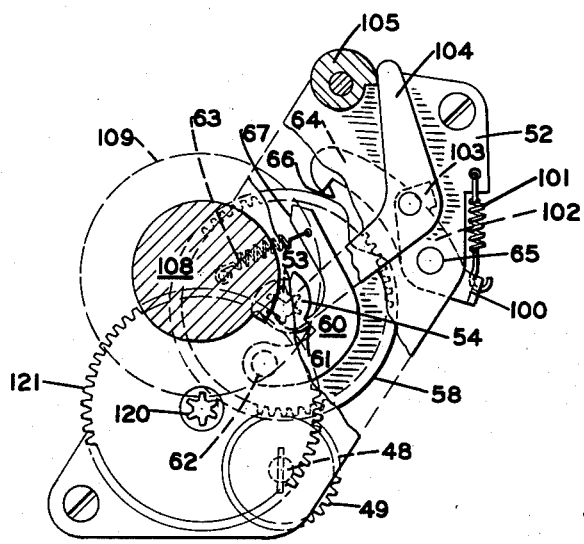
FIG. 6 is a detail view of a portion of the mechanism shown in FIG. 5 and illustrating the parts in different operative positions.
Figure 8:
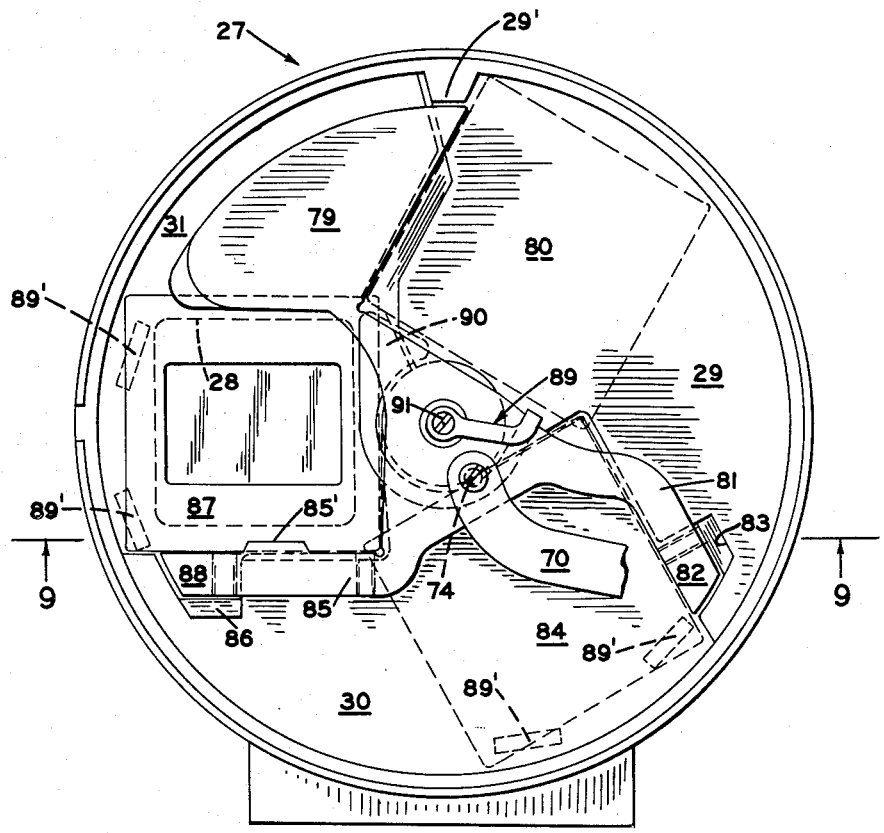
FIG. 8 is a view of the slide transfer mechanism.
Figure 9:
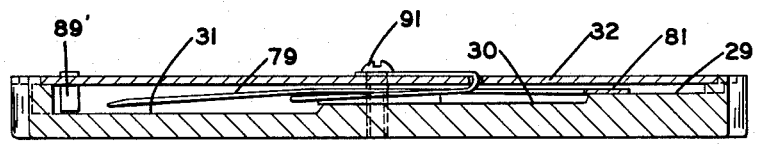
FIG. 9 is a sectional view taken substantially along the line 9—9 in FIG. 8 and showing certain features of the slide transfer mechanism.

During the latter half of the rotational cycle of the clutch 55, the multi-armed member 73 returns to the position shown in FIG. 8 due to the return of link 70 to its initial position shown in FIG. 5. A stop 29' prevents a subsequent slide from being dragged counterclockwise by the returning arm 79. A second arm 81 formed on multi-armed member 73 has a bent end 82 adapted to be received within a pocket 83 in surface 29 in order to engage the side edge of a slide 84 disposed on surface 30. Upon the next subsequent revolution of clutch member 55, the link 70 causes the multi-armed member 73 to oscillate once more and arm 81 is effective to advance slide 84 across surface 30 until it passes over the step and reaches the projection position on surface 31. Upon the completion of this cycle of the multi-armed member 73, a third arm 85 thereon is disposed in a pocket 86 in surface 30 in engagement wtih the edge of slide 87 disposed in projection position in alignment with opening 28. Upon the next oscillation of the multi-armed member 73, a foot 88 on arm 85 is effective to push the slide 87 across surface 31 and out of the slide transfer mechanism into the slide receiving compartment 37. The arm 85 has a projection 85' which prevents the slide 87 from disengaging the arm until completion of the projection cycle.

With reference particularly to FIGS. 8 and 10, the slide transfer mechanism 27 includes a leaf spring member 89 which is formed so that the major portion thereof is received within the stepped passageway defined by the surfaces 29, 30 and 31. The slide transfer mechanism 27 also includes a plurality of small leaf springs 89' disposed as shown. The spring 89 and springs 89' are effective at all times to retain the inner edges of the slides against surfaces 29, 30 and 31 so as to prevent them from becoming jammed during their movement through the slide transfer mechanism. The springs 89' also prevent the slides from backing up on the return stroke of the multi-armed member 73. The spring member 89 has a trailing end 90 which is effective to urge the slide 87 out of the slide transfer mechanism as it emerges therefrom and into the slide storage compartment 37. It should be noted that the spring 89 is mounted by means of a bolt 91 which also rotatably mounts the multi-armed member 73.

From FIG. 8 it will be noted that the leading corner of each slide as it is disposed in the slide transfer mechanism overlaps the trailing corner of the immediately preceding slide. Due to this construction and due to the action of the leaf spring 89, the proper sequence of slides is at all times maintained as they progress through the slide transfer mechanism 27.

The slide projector includes a shutter 92 carried by a rod 93 which is rigidly mounted on shaft 65. The rod 93 is integrally secured to a cam follower 94 which rides the surface of cam 57 and upon movement of the cam 57 to the position shown in FIG. 11, the follower 94 drops onto the low part of the cam and allows the shutter 93 to be dropped from blocking position with respect to projection opening 28. The relatively steep drop-off of cam 57 prevents the cam from rotating in the reverse direction. As soon as the cam 57 rotates out of the position shown in FIG. 11, the shutter 92 is moved upwardly so as to shut off light from projection lamp 23 and this occurs during movement of one slide out of projection position and another slide into projection position.

Figure 3:
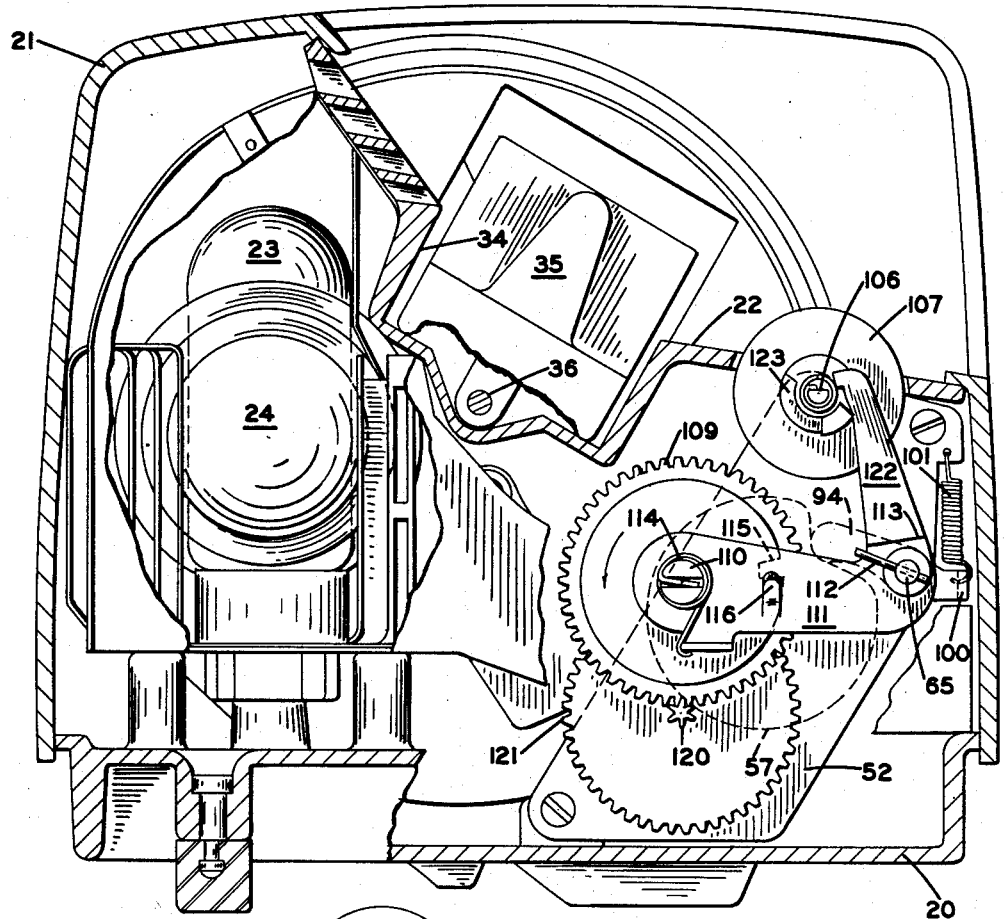
FIG. 3 is a sectional view taken substantially along the line 3—3 in FIG. 1.
Figure 4:
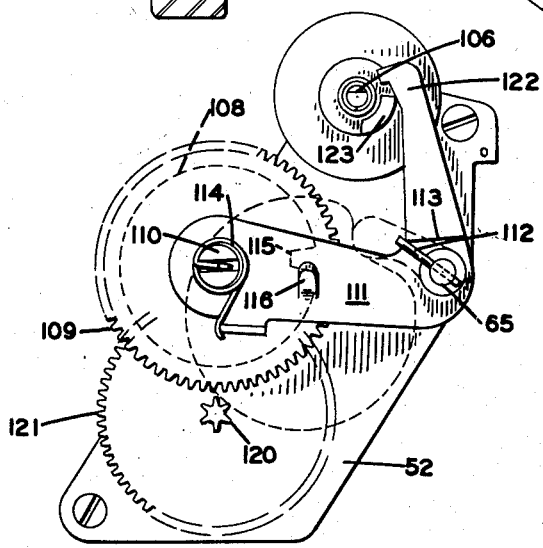
FIG. 4 is a detail view of certain of the elements of FIG. 3 but shown in slightly different operative positions.

The mechanism for controlling the actuation of the control lever 64 which in turn controls the engagement of clutch 55 will now be described. It was stated heretofore that the control lever 64 is pivotally mounted on shaft 65. The control lever 64 includes a U-shaped portion 100 which is normally urged upwardly by means of a spring 101 and is also formed with an arm 102 carrying a foot 103. The arm 102 is pivotally interconnected with a differentially positionable lever 104, the upper end of which cooperates with a manually controlled cam 105 mounted on a rotatable shaft 106 and carried by a manually adjustable spool member 107 and the lower end of which cooperates with a cam 108 integrally carried by a timing gear 109. The timing gear 109 is rotatably mounted by means of a pin or shaft 110 carried at the end of a bell crank lever 111 which itself is mounted for limited pivotal movement on shaft 65 by means of a pin 112 which cooperates with a shoulder 113 on the bell crank lever 111. The timing gear 109 is normally urged by means of a coil spring 114 in a clockwise direction, as viewed in FIGS. 7, 4 and 3, with a lug 115 on the timing gear being adapted to abut an outstanding lug 116 on the bell crank lever 111 when the timing gear 109 is in its starting position. When the bell crank lever 111 is rotated in a counterclockwise direction, as is permitted at the time that the shaft 65 is in the position shown in FIG. 3, the timing gear 109 is in mesh with a pinion gear 120 integrally formed with a large gear 121. The large gear 121 and pinion gear 120 are rotatably mounted and the gear 121 is adapted to continuously mesh with pinion gear 53 which is continuously motor driven for so long as the slide projector is in operation.

The bell crank lever 111 has a second arm 122 which extends upwardly and is cooperable with a stop lug 123 formed on the end of the manual control knob 107. The manual control knob 107 is rotatably mounted on the shaft 106 and also mounted on the shaft 106 is a manual control button 125 which has a wire 126 connected thereto with an end 127 cooperable with foot 103 in order to manually effect movement of clutch control lever 64 so as to effect engagement of clutch 55. Also mounted on the shaft 106 is an electric control switch 130 which controls the energizing circuit (not shown) for the driving motor and projection lamp 23.

The slide projector may be conditioned for automatic operation by positioning the manual dial 107 in such a way that the lug 123 is disengaged from the upper end 122 of bell crank lever 111. Under these conditions, the cam 105 will be in engagement with the upper end of differential position lever 104 while the lower end of lever 104 is in engagement with cam 108. Due to the fact that the upper end 122 of bell crank 111 is disengaged from the lug 123, the timing control gear 109 will be in meshing engagement with the pinion 120. The timing gear 109 will thus be continuously rotated in a counterclockwise direction until the cam 108 carried thereby rotates sufficiently to actuate differential lever 104 and in turn pivot lever 64 so as to cause tooth 66 to disengage the upper end of clutch dog 60. The clutch dog tooth 61 is then free to engage one of the teeth 54 on the clutch member 54 and the clutch will effect a cycling of the slide transfer mechanism. Under these conditions the rotation of cam in cooperation with follower 94 raises shutter 92 to shut off the light from the viewing screen. At the same time, shaft 65 is rotated due to the follower 94 being raised and pin 112 engages shoulder 113 on bell crank lever 111 to lift timing gear 109 from engagement with pinion gear 120. Thus, the spiral spring 114 is free to return the timing gear 109 and cam 108 to the initial position with lug 115 in engagement with lug 116.

It will be apparent that the elapsed interval of time between cycling operations of the transfer mechanism 27, when the projector is functioning automatically, is simultaneously controlled by manual control cam 105 as well as by time control cam 108. By changing the rotational position of manual control knob 107, the cam 105 is changed and thus the amount that cam 108 will be required to move the differentially controlled differential position lever 104 will be changed.

When it is desired to control the cycling operation of the projector entirely manually, the knob 107 is rotated in a counterclockwise direction in order to bring the lug 123 into engagement with the upper end 122 of bell crank 111. This has the effect of retaining the timing gear 109 in a lifted position, similar to the position shown in FIG. 4 when it is lifted by pin 112. Under these conditions, no amount of movement of cam 108 takes place and the clutch 55 remains disengaged until the manual knob 125 is depressed in order to rotate the end 127 of wire 126 in a counterclockwise direction in order to lift foot 103 and in turn lift the end 66 of control lever 64 from engagement with the upper end of clutch dog 60. Thus, under these conditions the clutch 55 will be engaged in order to effect a cycling operation.

If 107 is rotated counterclockwise during an automatic timing operation, the ramp on lever 122 will be cammed by lug 123 out to the lifted position, disengaging timing gear 109 from pinion 120 and suspending the operation of the automatic timing mechanism.

The automatic timing cycle may be interrupted by the manual knob 125 without harm at any time, since the cycling operation thus manually started merely disengages timing gear 109 from pinion 120 temporarily, the spring 114 resetting timing gear 109 to its starting position.

As is apparent, considerable control over the time interval between slide cycling operations is effected by means of changing the setting of control knob 107. This is desirable as most persons utilizing the slide projector wish a considerable degree of control over the duration that the slides appear on the viewing screen.

It is contemplated that numerous changes and modifications may be made in the present invention without departing from the spirit or scope thereof.

What is claimed is:

1. In a slide projector including a projection lamp, condenser lens assembly and projection lens assembly aligned on a common optical axis, the combination of a slide transfer mechanism, a slide storage compartment disposed on one side of said transfer mechanism, a slide receiving compartment disposed on the other side of said transfer mechanism, said transfer mechanism defining a stepped generally helical path for conveying slides therethrough, said transfer mechanism intersecting said optical axis and thereby defining a slide projection position whereby an image from each slide is projected by the projector, and said transfer mechanism including oscillatable means for advancing successive slides from said storage compartment into successive stepped positions along said path and thence into said slide receiving compartment.

2. In a slide projector including a projection lamp, condenser lens assembly and projection lens assembly aligned on a common optical axis, the combination of a slide transfer mechanism including means defining a generally helical path including a position for respectively positioning the slides in a projection position which intersects said optical axis, a slide storage compartment disposed on one side of said transfer mechanism, a slide receiving compartment disposed on the other side of said transfer mechanism, and said transfer mechanism further including an oscillatable multi-armed member for advancing slides successively through said path in said transfer mechanism from said storage compartment into said projection position and thence into said receiving compartment.

3. In a slide projector including a projection lamp, condenser lens assembly and projection lens assembly aligned on a common optical axis, the combination of a slide transfer mechanism, a slide storage compartment disposed on one side of said transfer mechanism, a slide receiving compartment disposed on the other side of said transfer mechanism, said transfer mechanism including means defining a multi-stepped generally helical path leading from said slide storage compartment to said slide receiving compartment, one of the path steps defining a slide projection position disposed in intersecting relation to said optical axis, and said transfer mechanism further including a multi-armed member mounted for oscillatory movement for successively advancing slides from said storage compartment through each of the steps of said path to said receiving compartment.

4. In a slide projector including a projection lamp, condenser lens assembly and projection lens assembly aligned on a common optical axis, the combination of a slide transfer mechanism, a slide storage compartment disposed on one side of said transfer mechanism, a slide receiving compartment disposed on the other side of said transfer mechanism, said transfer mechanism including means defining a generally helical path leading from said slide storage compartment to said slide receiving compartment and including at least two steps defining a slide preheating position and a slide projection position, and said transfer mechanism further including an oscillatable three-armed member for successively advancing slides from said storage compartment through said preheating and projection positions to said slide receiving compartment.

5. In a slide projector including a projection lamp, condenser lens assembly and projection lens assembly aligned on a common optical axis, the combination of a slide transfer mechanism, a slide storage compartment disposed on one side of said transfer mechanism, a slide receiving compartment disposed on the other side of said transfer mechanism, said transfer mechanism including a generally circular angularly stepped surface leading from said slide storage compartment to said slide receiving compartment, said transfer mechanism including a multi-armed member for successively advancing slides from said storage compartment to each of the steps and thence to said receiving compartment, and said transfer mechanism including resilient means for biasing the advancing slides toward said stepped surface in order to facilitate maintaining the slides in predetermined order as they are advanced through said transfer mechanism.

6. In a slide projector including a projection lamp, condenser lens assembly and projection lens assembly aligned on a common optical axis, the combination of a slide transfer mechanism, a slide storage compartment disposed on one side of said transfer mechanism, a slide receiving compartment disposed on the other side of said transfer mechanism, said slide transfer mechanism comprising a generally helical angularly stepped path forming positions angularly spaced by approximately 120° and comprising a slide entrance position, a slide preheating position, a slide projection position and a slide exit position, sad slide entrance and exit positions being disposed in the same angular position but on opposite sides of the transfer mechanism and respectively adjacent the storage and receiving compartments, and an oscillatable three-armed member oscillatable through approximately 120° for successively advancing slides from said storage compartment and through the preheating and projection positions to the receiving compartment adjacent said slide exit position.

7. In a slide projector including a projection lamp, condenser lens assembly and projection lens assembly aligned on a common optical axis, the combination of a slide transfer mechanism comprising means defining a plurality of substantially helically arranged steps, a slide storage compartment disposed on one side of said transfer mechanism, a slide receiving compartment disposed on the other side of said transfer mechanism, and a multi-armed member oscillatably movable for successively advancing a plurality of slides from said slide storage compartment to each successive step and thence to said slide receiving compartment, said transfer mechanism steps being so constructed and arranged that the leading and trailing corners of the slide disposed on each step overlap slightly the trailing and leading corners of the next adjacent slides whereby the sequential arrangement of the slides is at all times maintained as the same are advanced through said slide transfer mechanism.

References Cited by the Examiner
UNITED STATES PATENTS

| | | | |
|---|---|---|---|
| 1,437,112 | 11/22 | Lepine | 88—28 |
| 2,115,280 | 4/38 | Perlman | 58—39.5 |
| 2,163,419 | 6/39 | Warren | 58—39.5 |
| 2,613,574 | 10/52 | Moss | 88—28 |
| 3,011,398 | 12/61 | Clark | 88—28 |

NORTON ANSHER, *Primary Examiner.*

EMIL G. ANDERSON, G. Y. CUSTER, *Examiners.*